United States Patent
Uchida (10) Patent No.: US 7,236,840 B2
(45) Date of Patent: Jun. 26, 2007

(54) MANUFACTURING PROCESS DEVELOPING METHOD FOR SEMICONDUCTOR DEVICE

(75) Inventor: Hirofumi Uchida, Shiga (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 81 days.

(21) Appl. No.: 10/921,150

(22) Filed: Aug. 19, 2004

(65) Prior Publication Data

US 2005/0043839 A1    Feb. 24, 2005

(30) Foreign Application Priority Data

Aug. 20, 2003  (JP) ............................. 2003-296061
Oct. 28, 2003  (JP) ............................. 2003-366876

(51) Int. Cl.
G06F 19/00    (2006.01)

(52) U.S. Cl. .................... 700/97; 700/100; 700/103; 700/121

(58) Field of Classification Search .................. 700/95, 700/97, 103, 108, 109, 110, 121, 99, 100, 700/14, 16, 17, 18; 438/14, 16, 17, 18
See application file for complete search history.

(56) References Cited

U.S. PATENT DOCUMENTS

| | | | | |
|---|---|---|---|---|
| 5,134,560 A | * | 7/1992 | Ferriter et al. | 700/83 |
| 5,285,392 A | * | 2/1994 | Kyle et al. | 700/100 |
| 5,991,528 A | * | 11/1999 | Taylor et al. | 700/95 |
| 6,128,588 A | * | 10/2000 | Chacon | 703/6 |
| 6,411,377 B1 | * | 6/2002 | Noguchi et al. | 356/237.4 |
| 6,438,436 B1 | * | 8/2002 | Hohkibara et al. | 700/100 |
| 6,535,784 B2 | * | 3/2003 | Joma et al. | 700/100 |
| 6,546,308 B2 | * | 4/2003 | Takagi et al. | 700/121 |
| 6,597,962 B2 | * | 7/2003 | Nonaka | 700/95 |
| 6,694,202 B2 | * | 2/2004 | Miyazaki | 700/96 |
| 6,711,454 B2 | * | 3/2004 | Joma et al. | 700/121 |
| 6,714,830 B2 | * | 3/2004 | Browning | 700/100 |
| 6,763,277 B1 | * | 7/2004 | Allen et al. | 700/100 |
| 6,807,655 B1 | * | 10/2004 | Rehani et al. | 716/4 |
| 6,885,977 B2 | * | 4/2005 | Gavra et al. | 702/185 |
| 6,889,178 B1 | * | 5/2005 | Chacon | 703/6 |
| 2002/0165744 A1 | * | 11/2002 | Juras et al. | 705/7 |
| 2002/0168787 A1 | * | 11/2002 | Noguchi et al. | 438/16 |

OTHER PUBLICATIONS

Kimura, Masahide. "The Design Ability, from Design Philosophy to Implementation, Why Matsushita Took a Lead in Mass-Production of 0.13 m Devices", Nikkei Microdevices, pp. 89-96, published on May 2003.

* cited by examiner

Primary Examiner—Leo Picard
Assistant Examiner—Charles Kasenge
(74) Attorney, Agent, or Firm—McDermott Will & Emery LLP (57) ABSTRACT

Before a process design stage of judging whether a process flow involves any problems, items and standards of a process PAC, which is a PAC of a process necessary for development of a manufacturing process, and of an element PAC, which is a PAC of an element technology used in the process are set, while linking the process PAC and the element PAC with each other.

20 Claims, 8 Drawing Sheets

Gate formation: Gate formation module/First module PAC

| | PAC item | Rank | Standard | Judge |
|---|---|---|---|---|
| (a) | Sheet resistance | A | R=10±2Ω/□ | |
| (b) | Gate reliability | B | Lifetime over 10 years | |
| (a) | Defect density | A | Defect density less than 0.8 | |
| (b) | | B | Defect density less than 0.5 | |

(a) Sheet resistance relation
(b) Reliability relation
(c) Defect density relation Gate etching: First element PAC

| | PAC item | Rank | Standard | Judge |
|---|---|---|---|---|
| (a) | Etching rate uniformity | A | ±10% or less | |
| (a) | Etching selectivity uniformity | A | ±10% or less | |
| (a) | Etched shape uniformity | A | ±8% or less | |
| (c) | Killer defect count | A | 20 or less | |

Gate oxide film: Second element PAC

| | PAC item | Rank | Standard | Judge |
|---|---|---|---|---|
| (a) | Growth rate uniformity of oxide film | A | ±10% or less | |
| (a) | Thickness uniformity of oxide film | A | ±10% or less | |
| (b) | Lifetime of oxide film | A | 1000 μ sec. or more | |
| (c) | Killer defect count | A | 15 or less | |

Gate etching equipment: First equipment PAC

| | PAC item | Rank | Standard | Judge |
|---|---|---|---|---|
| (a) | Gas flow rate precision | AA | ±1% or less | |
| (a) | Vacuum leakage rate stability | AA | ±1% or less | |
| (b) | Metal contamination | AA | $10^{-8}$ or less | |
| (c) | Particle count | A | 30 or less | |

Gate oxide film forming equipment: Third equipment PAC

| | PAC item | Rank | Standard | Judge |
|---|---|---|---|---|
| (a) | Gas flow rate precision | AA | ±1% or less | |
| (a) | Thickness uniformity within wafer | AA | ±5% or less | |
| (b) | Metal contamination | AA | $10^{-10}$ or less | |
| (c) | Particle count | A | 25 or less | |

FIG. 6

(a) Sheet resistance relation
(b) Reliability relation
(c) Defect density relation Gate etching equipment: First equipment PAC

| | PAC item | Rank | Standard | Judge |
|---|---|---|---|---|
| (a) | Gas flow rate precision | AA | ±1% or less | |
| (a) | Vacuum leakage rate stability | AA | ±1% or less | |
| (b) | Metal contamination | AA | $10^{-8}$ or less | |
| (c) | Particle count | AA | 30 or less | |

→ Inherent standard in equipment is ±5% or less. (±1% or less in accordance with demand of equipment PAC)
→ Inherent standard in equipment is ±2% or less. (±1% or less in accordance with demand of equipment PAC)
→ Inherent standard in equipment is $10^{-6}$ or less. ($10^{-8}$ or less in accordance with demand of equipment PAC)
→ Inherent standard in equipment is 50 or less. (30 or less in accordance with demand of equipment PAC)

Oxide film forming equipment: Third equipment PAC

| | PAC item | Rank | Standard | Judge |
|---|---|---|---|---|
| (a) | Gas flow rate precision | AA | ±1% or less | |
| (a) | Thickness uniformity within wafer | AA | ±5% or less | |
| (b) | Metal contamination | AA | $10^{-10}$ or less | |
| (c) | Particle count | A | 25 or less | |

→ Inherent standard in equipment is ±5% or less. (±1% or less in accordance with demand of equipment PAC)
→ Inherent standard in equipment is ±8% or less. (±5% or less in accordance with demand of equipment PAC)
→ Inherent standard in equipment is $10^{-8}$ or less. ($10^{-10}$ or less in accordance with demand of equipment PAC)
→ Inherent standard in equipment is 40 or less. (25 or less in accordance with demand of equipment PAC)

MANUFACTURING PROCESS DEVELOPING METHOD FOR SEMICONDUCTOR DEVICE

BACKGROUND ART

The present invention relates to a manufacturing process developing method, and particularly relates to a manufacturing process developing method for a semiconductor and the like.

In development of manufacturing processes for semiconductor products, conventionally, a procedure is dominantly employed in which wafers are processed through a full process, which is a series of manufacturing steps all combined, and then the resultant is verified. However, this procedure requires much time for process development. In detail, it takes about two to three months from the commencement of a full process to the end of verification because of increased number of steps. Further, the verification must be performed plural times, and therefore, a longer time is required for process development as a whole. For example, even for a minor partial change in a manufacturing process, a full process must be run through for evaluation of the change. Thus, process development requires enormous time. For tackling this problem, a method in which a full process is divided into a plurality of modules by step units such as an element isolation step, a wiring step, and a process of each module is developed (see, NIKKEI MICRODEVICES, May, 2003, pp. 91-93, for example). The process development per module unit reduces the time required for verification to about one week per one time though it depends on a module dividing manner. It is noted that each module is composed of a combination of small pieces of steps such as a lithography step, an etching step practically.

However, mere division of a full process into plural modules does not lead to efficient process development with good yield.

SUMMARY OF THE INVENTION

The present invention has been made in view of the above problems and has its object of providing a method for realizing speedy process development and for enhancing the yield and the quality of a product manufactured by a developed process in an early stage, and particularly has its object of enhancing the effectiveness of a method for developing a process per module unit.

To attain the above objects, a first manufacturing process developing method according to the present invention that includes a process design step of judging whether a process flow involves any problems, includes the step of: a PAC setting step of setting, prior to the process design step, items and standards of a process PAC, which is a set of process acceptance criteria necessary for development of a manufacturing process, and items and standards of an element PAC, which is a set of process acceptance criteria of an element technology used in the process, while linking the process PAC with the element PAC.

According to the first manufacturing process developing method, each PAC item and each PAC standard are determined while linking the process PAC and the element PAC with each other in the PAC setting step prior to the commencement of verification of the process flow by a sample experiment and the like. Hence, mismatching and the like among respective technologies can be rectified in the PAC setting step prior to the verification of the process flow including recipes, with a result that the times of retry or redesign of the process development is reduced and speedy process development can be realized. Further, the yield and the quality of a product manufactured by the developed process can be enhanced in an early stage. Wherein, there may be a plurality of process PACs and element PACs.

In the first manufacturing process developing method, the PAC setting step may include setting items and standards of an equipment PAC, which is a set of process acceptance criteria of a manufacturing equipment used in the process or the element technology, while linking the equipment PAC with the process PAC or the element PAC. Whereby, mismatching and the like among the respective technologies can be rectified more surely. Wherein, there may be a plurality of equipment PACs. In this case, the PAC setting step may include setting, as a standard of the equipment PAC, a standard determined based on a relationship between the equipment PAC and the process PAC or the element PAC, instead of an independent standard of the manufacturing equipment.

A second manufacturing process developing method according to the present invention is provided for developing a full process necessary for development of a manufacturing process in a short period of time by dividing the full process into a plurality of modules and increasing a degree of perfection of the development in the modules, and includes a process design step of judging whether a process flow involves any problems, wherein the method includes the steps of: a PAC setting step of setting, prior to the process design step, items and standards of module PACs, which are sets of process acceptance criteria of the modules, and items and standards of element PACs, which are set of process acceptance criteria of element technologies used in the modules, while linking the module PACs with the element PACs.

According to the second manufacturing process developing method, a process is developed by dividing a full process into a plurality of modules. Therefore, if process conditions are set so as to meet the PAC standards in each module through PAC verification in judgment how far the process development is promoted, the judgment being performed after the process design step, the following effects can be obtained. Namely, a degree of perfection of the process development can be increased in each module while promoting the process development in the respective modules in parallel, with a result of speedy development of the full process for, for example, a semiconductor product or the like.

According to the second manufacturing process developing method, each PAC item and each PAC standard are determined in the PAC setting step, while linking the module PAC and the element PAC with each other, prior to the commencement of verification of the process flow by a sample experiment and the like. Therefore, mismatching and the like among the respective technologies can be rectified by performing the PAC setting step prior to the verification of the process flow including recipes, with a result that the times of retry or redesign of the process development is reduced and speedy process development is realized. Further, the yield and the quality of a product manufactured by the developed process can be enhanced in an early stage. Wherein, there may be a plurality of module PACs and element PACs.

In the second manufacturing process developing method, the PAC setting step may include setting items and standards of equipment PACs, which are sets of process acceptance criteria of manufacturing equipments used in the modules or the element technologies, while linking the equipment PACs with the module PACs or the element PACs. Whereby, mismatching and the like among the respective technologies can be rectified more surely. Wherein, there may be a plurality of equipment PACs. In this case, the PAC setting step may include setting, as standards of the equipment PACs, standards defined based on a relationship between the equipment PACs and the module PACs or the element PACs, instead of independent standards of the manufacturing equipment.

In the first or second manufacturing process developing method, it is preferable to further include the step of: a process condition establishment step of judging, after the process design step, whether process conditions of the process flow involve any problems in factory lines. By this inclusion, the degree of perfection of the manufacturing process can be checked surely. Further, in this case, it is possible to perform a PAC verification step of verifying whether values of the items of the PACs set in the PAC setting step meet respectively the standards of the PACs set in the PAC setting step in the process condition establishment step.

In the first or second manufacturing process developing method, it is preferable to further include the step of: a sample evaluation step of judging, between the process design step and the process condition establishment step, whether the process conditions of the process flow involve any problems in sample lines.

By this inclusion, the degree of perfection of the manufacturing process can be checked surely. In this case, it is possible to perform a PAC verification step of verifying whether values of the items of the PACs set in the PAC setting step meet respectively the standards of the PACs set in the PAC setting step in the sample evaluation step.

In the first or second manufacturing process developing method, it is preferable to further include the step of: a process completion step of judging, after the process condition establishment step, whether the process conditions of the process flow involve any problems in mass production lines in a factory.

By this inclusion, the degree of perfection of the manufacturing process can be checked surely. In this case, a PAC verification step of verifying whether values of the items of the PACs set in the PAC setting step meet respectively the standards of the PACs set in the PAC setting step may be performed in the process completion step. Wherein, in the case where the PAC verification step is performed in the process completion step, the PAC setting step may include setting a defect density or reliability as one of the items of the PACs and setting a standard of the defect density or the reliability and the PAC verification step may include verifying whether a value of the defect density or the reliability meets the standard.

In the first or second manufacturing process developing method, it is preferable to include the step of: a PAC verification step of verifying, after the process design step, whether values of the items of the PACs set in the PAC setting step meet respectively the standards of the PACs set in the PAC setting step.

By this inclusion, the degree of perfection of the process development in each module unit can be surely increased, while promoting the process development in the respective modules in parallel.

In this case, if a process completion step of judging, after the process design step, whether process conditions of the process flow involve any problems in mass production lines in a factory is included and the PAC verification step is performed plural times between the process design step and the process completion step, the following effect can be obtained. Namely, priority of timing of the PAC verification to be performed is set for each PAC item, so that the process conditions can be determined taking account of a PAC item with a higher degree of urgency or of importance that is a PAC item that must meet its PAC standard promptly. Wherein, in the case where the PAC verification step is performed plural times between the process design step and the process completion step, the PAC setting step may include setting a defect density or reliability as one of the items of the PACs and setting a standard of the defect density or the reliability, and at least one time of PAC verification step that is performed plural times includes verifying whether a value of the defect density or the reliability meets the standard.

If the first or second manufacturing process developing method includes the PAC verification step, it is preferable that the PAC setting step includes setting a timing of performing the PAC verification step for each item of each PAC set in the PAC setting step.

By this inclusion, a degree of urgency or importance can be set concurrently with the setting of the PAC items. Therefore, a PAC item with a higher degree of urgency or importance (i.e., PAC item that must meet its PAC standard early) can be clearly recognized from the beginning (prior to the process design step).

It is needless to say that the first and second manufacturing process developing methods are applicable to a semiconductor manufacturing process development.

As described above, when the present invention relating the manufacturing process developing method is applied to a manufacturing process developing method for a semiconductor and the like, mismatching and the like among technologies can be rectified in the PAC setting step prior to verification of the process flow including recipe. Therefore, speedy process development is realized and the yield and the quality of a product manufactured by the developed process can be enhanced in an early stage. Further, division of a full process into a plurality of modules and the PAC setting and verification for each module surely enhance the effectiveness of the process developing method per module unit. In other words, a degree of perfection of the process development in each module unit can be surely increased while promoting the process development in respective modules in parallel, thereby surely accelerating the development of the manufacturing process. Hence, the present invention is of enormous usefulness.

DETAILED DESCRIPTION OF THE INVENTION

A manufacturing process developing method according to one embodiment of the present invention will be described below with reference to accompanying drawings. Wherein, a semiconductor manufacturing process will be exemplified as the manufacturing process in the present embodiment.

Figure 1:
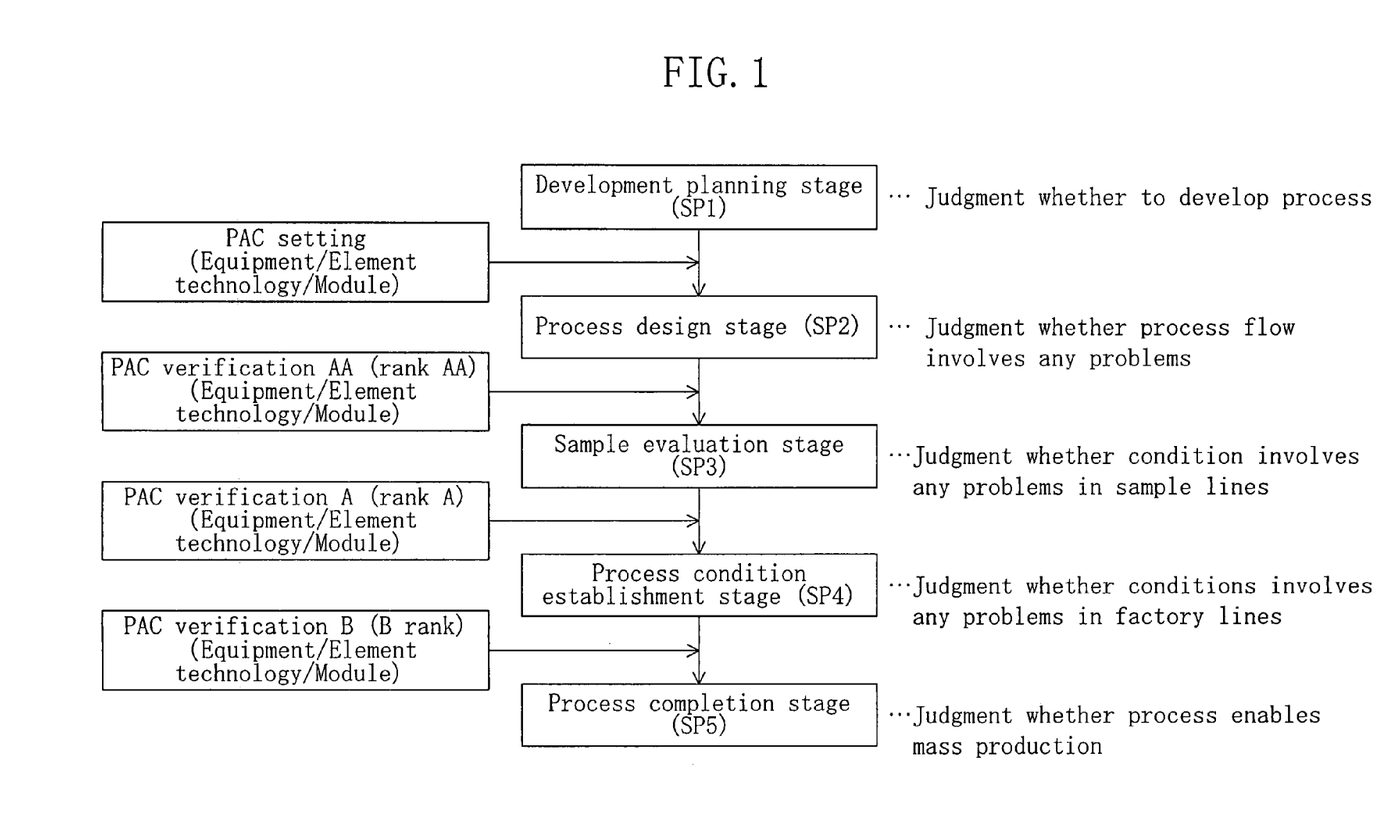
FIG. 1 is a flowchart showing a semiconductor manufacturing process developing method according to one embodiment of the present invention.

FIG. 1 is a flowchart of the semiconductor manufacturing process developing method according to the present embodiment. As shown in FIG. 1, a basic flow until manufacturing process development for a semiconductor is completed includes a development planning stage SP1, a process design stage SP2, a sample evaluation stage SP3, a process condition establishment stage SP4 and a process completion stage SP5.

The most significant feature of the present embodiment lies in that in evaluation of the degree of perfection of process development in the above respective stages, process conditions are established so as to clarify standard values (PAC conditions) of items required in the respective stages through PAC verification described later. Wherein, the PAC means a set of process acceptance criteria. In detail, it is a combination of technical items to be examined and numerical values (standard values) required and to be met in the respective items.

The basic flow sown in FIG. 1 will be described first.

[Development Planning Stage (SP1)]

As shown in FIG. 1, in the development planning stage SP1, "development planning" of a semiconductor manufacturing process is performed. Wherein, the "planning" means a step of judging whether a manufacturing process for a semiconductor product to be developed, for example, a process for a 90 nm-node CMOS (complementary metal-oxide semiconductor) should be developed. In this judgment, it is a matter of course to take account of demands of equipment sets such as mobile phones or digital household appliances, or funds or human resources in a development center in a company.

[Process Design Stage (SP2)]

A "process flow" is created for the semiconductor manufacturing process determined to be developed in the development planning stage SP1. For example, a process flow for a 90 nm-node CMOS manufacturing process that has been determined to be developed in the development planning stage SP1 is created. The creation of the "process flow" is performed based on circuit layout information from a LSI (large-scale integrated) circuit layout section in the company. Process conditions, which include detailed recipes (temperature, pressure and the like) in the process flow, are determined in this process design stage SP2, but may be approprelately changed and adjusted in the development, namely, in subsequent stages.

In the present embodiment, PAC setting described later is principally completed in this stage SP2 prior to a sample experiment so that each PAC item and each spec (PAC standard) are matched among modules, element technologies and equipments (manufacturing equipments).

[Sample Evaluation Stage (SP3)]

In the sample evaluation stage SP3, evaluation is performed as to whether the process conditions of the process flow created in the process design stage SP2 involve any problems as conditions in sample lines. In detail, in the sample evaluation stage SP3, the process is run through on the sample lines based on the process flow created in the previous stage SP2 to manufacture a sample product. Then, the aforementioned evaluation is performed with the thus manufactured sample product.

In the present embodiment, evaluation (PAC verification) is performed as to whether the thus manufactured sample product meets the PAC conditions determined in the PAC setting described later. The process conditions judged to be met in this evaluation are used in the following stage.

[Process Condition Establishment Stage (SP4)]

In the process condition establishment stage SP4, evaluation is performed as to whether the process conditions verified in the sample evaluation stage SP3 involve any problems as process conditions in factory lines. For example, a process for a 90 nm-node CMOS is run through on factory lines including mass production lines, and the aforementioned evaluation is performed with the thus manufactured CMOS.

In the present embodiment, judgment (PAC verification) as to whether the PAC conditions determined in the PAC setting described later are met is performed also in the process condition establishment stage SP4. The process conditions judged to be met in this evaluation are used in the following stage.

[Process Completion Stage (SP5)]

In the process completion stage SP5, judgment is performed as to whether the process conditions verified in the process condition establishment stage SP4 are conditions that allow mass production in the factory lines when taking account of yield, reliability and the like.

In the present embodiment, judgment (PAC verification) as to whether the PAC conditions determined in PAC setting described later are met is performed also in the process completion stage SP5.

[Utilization of PAC]

The PAC setting and the PAC verification by a PAC committee will be described next which are associated with the aforementioned stages SP1 to SP5, namely, the basic flow until the completion of the process development.

In the flow for developing the semiconductor manufacturing process shown in FIG. 1, the process development must be promoted so as to meet the preset PAC conditions (PAC conditions set in the PAC setting) in the respective stages of the sample evaluation stage SP3, the process condition establishment stage SP4 and the process completion stage SP5. In other words, it is necessary to set beforehand the PAC conditions (PAC setting) for the semiconductor manufacturing process to be met in the respective stages SP3 to SP5. This PAC setting is performed prior to the process design stage SP2. In detail, the process to be developed (process conditions) prior to a sample experiment and the like determines items (PAC items) and standard values (PAC standards) which are to be met in the respective stages SP3 to SP5. In other words, determination of the PAC conditions is performed as the PAC setting first. Then, the PAC verification is performed based on the PAC conditions determined in the PAC setting and the "process conditions" (process recipes such as temperature, pressure, treatment time) are determined so as to meet the PAC conditions (standard values) set in the PAC setting.

[PAC Setting Procedure]

As shown in FIG. 1, prior to an actual sample experiment, namely, prior to the judgment in the process design stage SP2, the PAC setting is performed. In detail, the PAC setting is performed before the judgment as to whether the created process flow and the process recipes involve any problems is performed in the process design stage SP2. Then, the PAC verification is performed based on the PAC conditions set in the PAC setting and the process conditions are determined so as to meet the PAC conditions.

A significant aspect in the technique for the PAC setting is that a thoroughgoing profound discussion, namely, thoroughgoing PAC setting is carried out until the process design stage SP2, namely, prior to the commencement of a sample experiment, thereby increasing a degree of perfection of the PAC setting. In such a profound discussion, the respective specialists in each module, each element and each equipment and expert engineers in relation to these technologies participate to thoroughly discuss a given condition relating to one another. Referring to, for example, a lithography technology and a dry etching technology both of which require sufficient margins, members of both groups relating to the respective technologies participate in the discussion to determine PAC conditions relating to both technologies and specs (standard values of PAC items) are recorded in a PAC document. In order to record the standards explicitly, a thoroughgoing discussion is required to be performed until every member is persuaded in determining a standard of an item that has been usually left vague between both the groups. In this way, the thoroughgoing profound discussion for the PAC setting procedure prior to a sample experiment leads to no overlooking to be considered in the stage prior to the experiment. Particularly, overlooking of mismatching among the respective technologies, which has occurred frequently, can be reduced.

To the contrary, in the case where modules are divided merely and process conditions are determined only by checking simple characteristics in each module as usual, such determined process conditions shall be denied by verification in a sample experiment and the like. In its turn, the full process must be repeated several-ten times, resulting in an enormous amount of time required for the process development. On the other hand, in the present embodiment, the reliability and the yield, which are evaluation items for a final product, are checked in each module, so that the number of times of the full process running is remarkably reduced in the process development.

Wherein, the PAC conditions in the PAC setting, which are expressed as items, standard values and the like, will be described later.

[PAC Verification Procedure]

As shown in FIG. 1, after the PAC setting and prior to the judgment in the sample evaluation stage SP3, a PAC verification procedure is performed based on the set PAC items and standards.

In the present embodiment, the PAC verification is performed not only one time, namely, plural times until the completion of the process development in the stages SP3 to SP5. In detail, as shown in FIG. 1, PAC verification AA is performed prior to the sample evaluation stage SP3, PAC verification A is performed prior to the process condition establishment stage SP4 and PAC verification B is performed prior to the process completion stage SP5.

Herein, the PAC verification AA means PAC verification for a PAC item ranked as AA, the PAC verification A means PAC verification for a PAC item ranked as A and the PAC verification B means PAC verification for a PAC item ranked as B. The ranks AA, A and B indicate before what stage in the basic flow until completion of the process development the PAC verification should be performed. In other words, it means that the timing of PAC verification to be performed is different according to the ranking. The rank AA, for example, indicates that the PAC verification should be performed prior to the sample evaluation stage SP3.

Wherein, in the PAC verification procedure in the respective stages, PAC verification itself proceeds without substantial discussion if all of the standards determined in the PAC setting procedure are met perfectly. Actually, however, there might be a case where no desired results are obtained even after the profound discussion is carried out in the PAC setting procedure, though the number of denied PAC conditions is far less than those as usual. Examination of countermeasure to such a case is one of significant tasks in the PAC verification. The countermeasure herein means change or give-and-take of the margin between the technologies (e.g., a margin for lithography is reduced to increase a margin for dry etching technology), spec change, step change and the like.

[Concept of Module]

The present embodiment does not mean process development per full process unit in accordance with the basic flow (see FIG. 1) of the process development utilizing the PAC setting and the PAC verification described as above, but means process development per module unit as described below.

Figure 2:
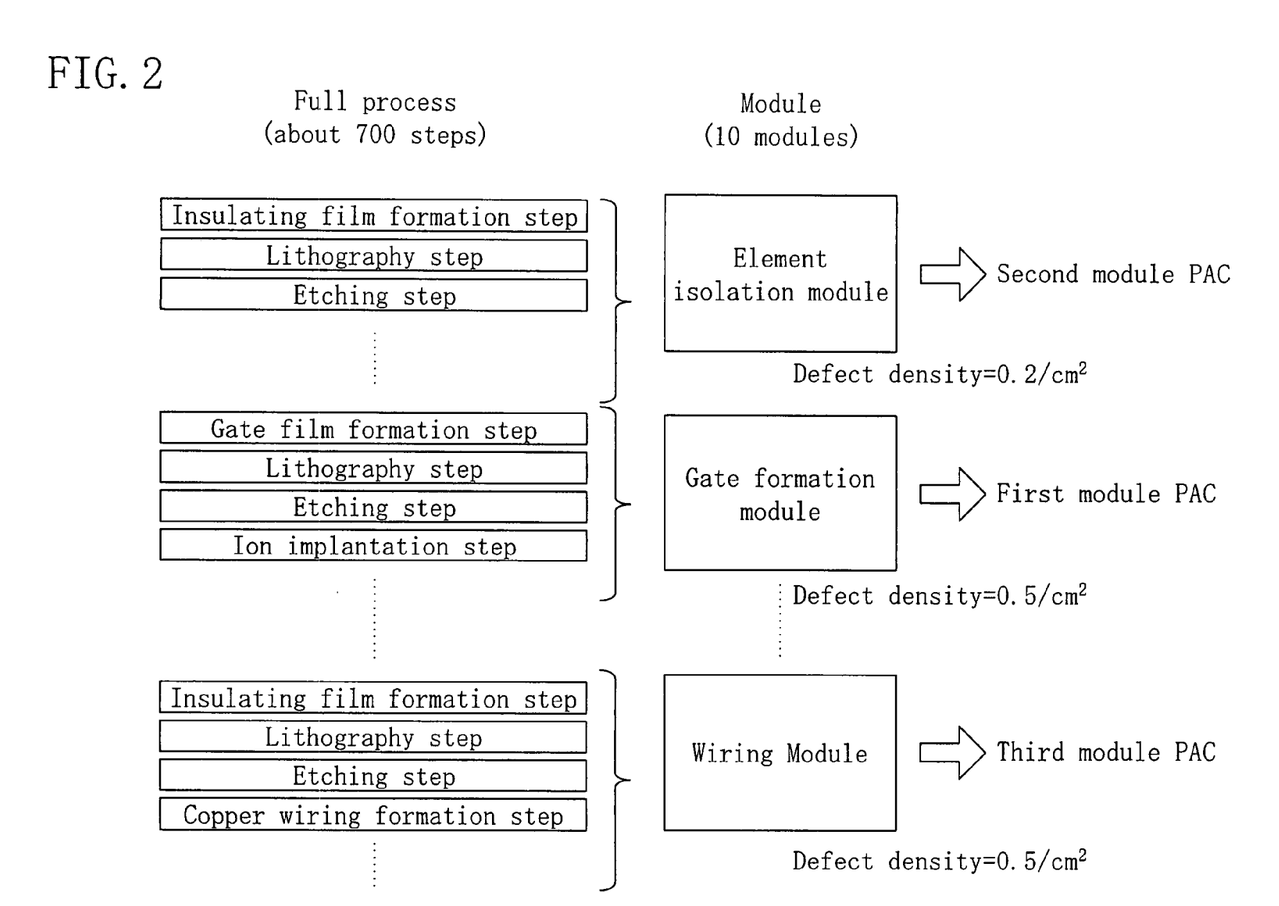
FIG. 2 is a view for explaining a method of dividing a full process into a plurality of modules in the semiconductor manufacturing process developing method according to the embodiment of the present invention.

FIG. 2 explains a method of dividing a semiconductor manufacturing process into a plurality of modules. As show in FIG. 2, the full process composed of about 700 steps as, for example, a 90 nm-node CMOS manufacturing process is divided into 10 modules, for example. In FIG. 2, three modules of an element isolation module, a gate formation module and a wiring module are represented.

The element isolation module includes steps of an insulating film formation step (e.g., formation of an oxide film or a nitride film), a lithography step (e.g., patterning of a resist on a nitride film), an etching step (e.g., etching of a nitride film or an oxide film, using a resist as a mask) and the like which are included in the full process. The gate formation module includes a gate insulating film formation step, a lithography step, an etching step, an ion implantation step and the like. The wiring module includes an interlayer insulating film formation step (deposition of an interlayer insulating film), a lithography step (e.g., patterning of a resist on an interlayer insulating film), an etching step (e.g., formation of a trench in an interlayer insulating film), a copper wiring formation step (e.g., formation of a barrier film and a copper wiring in a trench) and the like.

In the present embodiment, the full process is divided into 10 modules in this way and the process development is promoted so as to attain a higher degree of perfection per module unit, instead of the full process unit. In detail, in the process development per module unit, development is promoted in the respective modules in parallel so as to enhance the yield and the quality in the respective modules, using a test pattern (TEG: Test Element Group) for measuring electrically a degree of perfection of the process. In the parallel module development, when items and their standards of each module PAC, which is included in a PAC of a module, are set in the PAC setting, a defect density is set as a PAC item and its standard is determined in each module as shown in FIG. 2, for example. Specifically, the standard of the defect density is set to 0.2/cm² in the element isolation module (second module PAC), the standard of the defect density is set to 0.5/cm² in the gate formation module (first module PAC) and the standard of the defect density is set to 0.5/cm² in the wiring module (third module PAC). By increasing the degree of perfection of the process in each module in this way, the degree of perfection of the total process (the full process), which is aggregation of the modules, can be increased in a short period of time.

It is noted that principally, in dividing a full process into modules, electrical characteristics must be able to be evaluated independently in each divided module. In the gate formation module as a unit, for example, it is required that electrical characteristics such as sheet resistance can be measured in addition to that physical properties such as the sectional shape, the surface configuration of a device can be evaluated.

[PAC setting in Process Development per Module Unit]

The concept of the PAC setting in the process development per module unit will be described next by exemplifying the gate formation module, with reference to the drawings.

Figure 3:
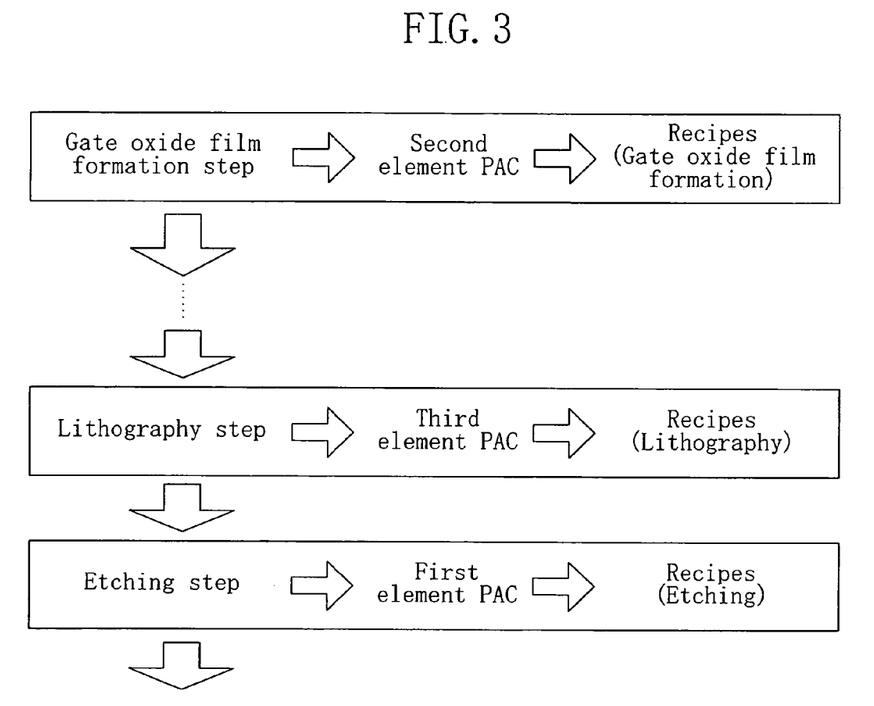
FIG. 3 is a flowchart showing a process flow of a gate formation module which is created in the semiconductor manufacturing process developing method according to the embodiment of the present invention.

FIG. 3 shows a flow of the gate formation module. As shown in FIG. 3, the gate formation module includes a plurality of steps, wherein representative three steps of a gate oxide film formation step, a lithography step and an etching step among the plural steps will be described below.

Figure 4:
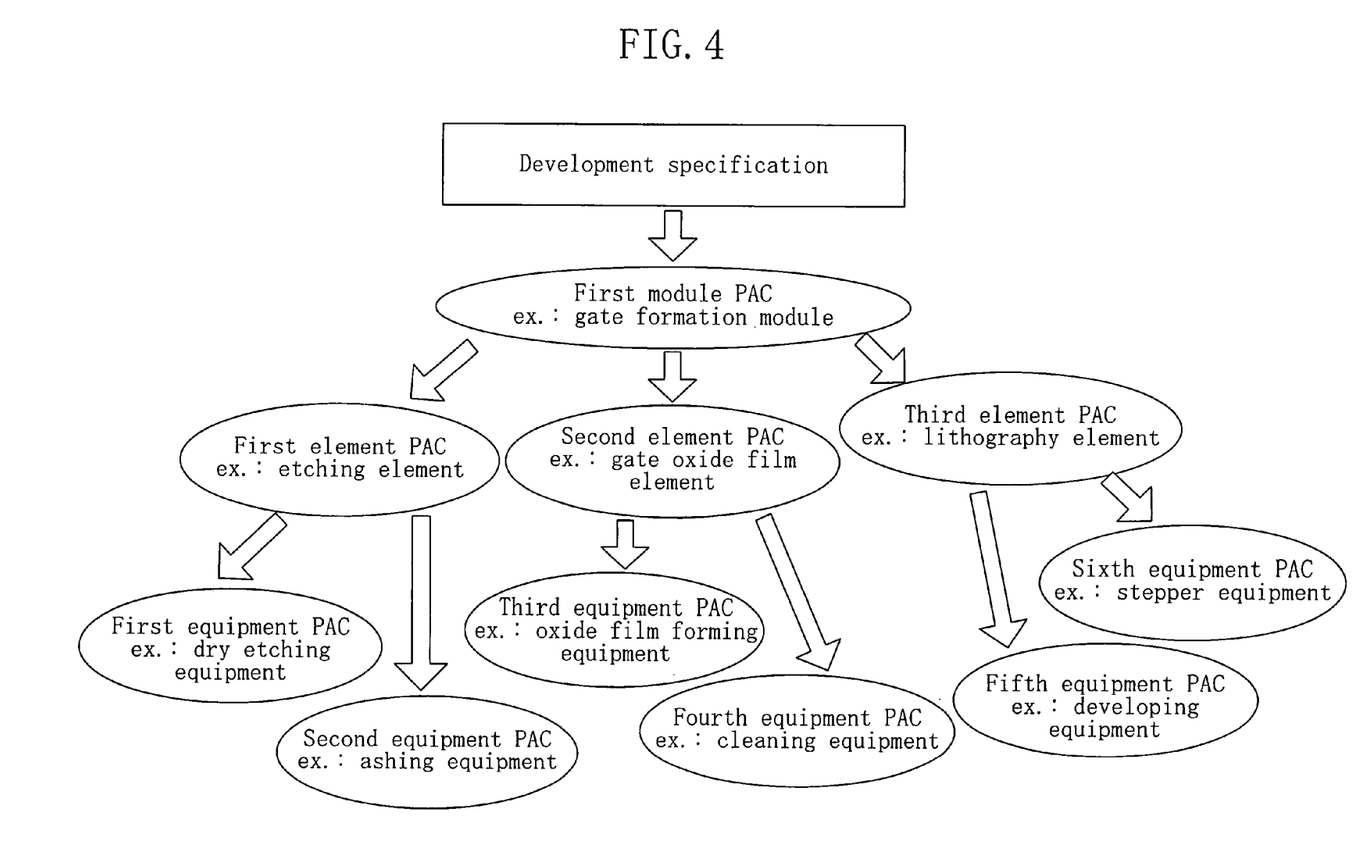
FIG. 4 is a view showing a relationship among PACs in PAC setting in the semiconductor manufacturing process developing method according to the embodiment of the present invention.

FIG. 4 shows a relationship among PACs in the PAC setting for the three representative steps (the gate oxide film formation step, the lithography step and the etching step) included in the gate formation module.

In the PAC setting, a module PAC is linked with PACs (hereinafter referred to as element PACs) of element processes (element technology such as etching) included in the module, in relation to the development specification of integration defined based on design information. Specifically, as shown in FIG. 4, a first module PAC (a PAC of the gate formation module) is linked with a first element PAC (a PAC of the etching element), a second element PAC (a PAC of the gate oxide film element) and a third element PAC (a PAC of the lithography element). Because, the module closely relates to the element processes used therein.

The respective element processes closely relate to respective equipments of a manufacturing system. In other words, the respective element technologies are intimately connected with respective manufacturing equipments utilizing them. Therefore, the respective element PACs are linked with the respective PACs of equipments (hereinafter referred to as equipment PAC). By this linking, the respective element technologies can be properly utilized by controlling the respective manufacturing equipments.

Specifically, as shown in FIG. 4, the first element PAC of the etching element is linked with a first equipment PAC of a dry etching equipment and a second equipment PAC of an ashing equipment, which are semiconductor manufacturing equipments. Similarly, the second element PAC of the gate oxide film element as is linked with a third equipment PAC of a gate oxide film forming equipment such as a thermal treatment equipment and a fourth equipment PAC of a cleaning equipment. The third element PAC of the lithography element is linked with a fifth equipment PAC of a developing equipment and a sixth element PAC of an exposure equipment such as a stepper.

As described above, the first module PAC of the gate formation module is linked with the plural element PACs (first to third element PACs) and the plural equipment PACs (first to sixth equipment PACs) based on the demands of the development specification.

[Item, Rank and Standard Numerical Value in PAC Setting]

The PAC conditions (item, rank and specification numerical value) determined in the PAC setting for each of the module PACs, the element PACs and the equipment PACs, namely, the PAC conditions to be met through PAC verification will be described next with reference to drawings.

Figure 5:
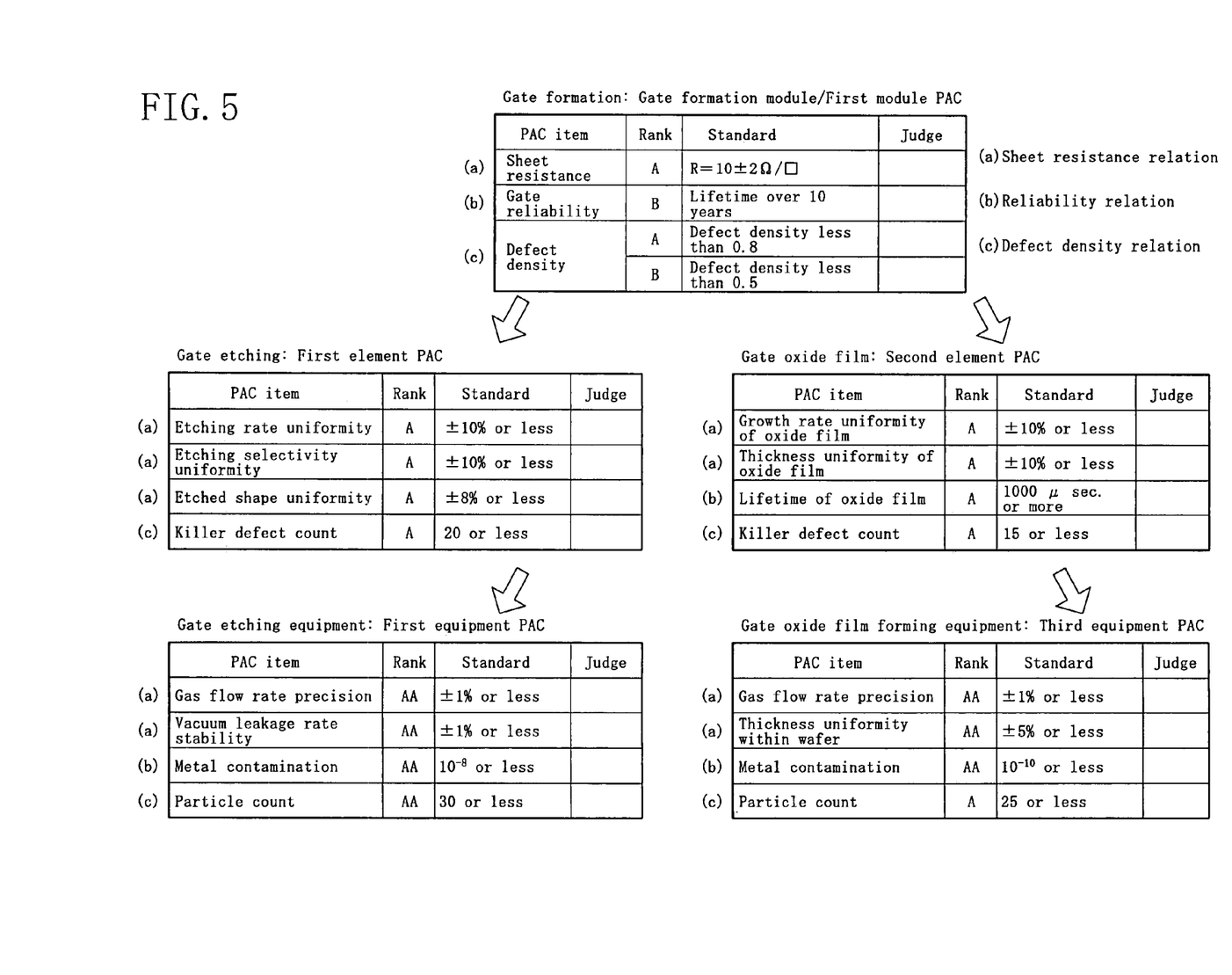
FIG. 5 is a view showing PAC conditions set in the PAC setting in the semiconductor manufacturing process developing method according to the embodiment of the present invention.

FIG. 5 shows the relationship of the PAC conditions (PAC conditions to be met through the PAC verification) respectively set for the first module PAC of the gate formation module, the first element PAC, the second element PAC, the first equipment PAC and the third equipment PAC shown in FIG. 4. In other words, FIG. 5 shows sheets of PAC items, ranks and standard values in each PAC.

In the PAC setting, the PAC conditions in a module PAC are set first in a mark sheet shown in FIG. 5, based on the development specification of the integration. In the mark sheet, there are columns for PAC item, rank, standard and judgment. Items to be judged in the PAC verification are put into the column of PAC item. The time limits relating to performance of the PAC verification is put into the column of rank. In the present embodiment, three ranks of AA, A and B are used as the ranking. "AA" means that the PAC verification is performed until a sample is completed (until the evaluation of the process conditions in sample lines is completed), "A" means that the PAC verification is performed until the evaluation of the process conditions in factory lines is completed, "B" means that the PAC verification is performed until the evaluation of the process conditions in mass production lines in the factory is completed. Acceptance or non-acceptance as a result of the PAC verification is put into the column of the judgment as Y or N. Referring to a PAC item ranked as, for example, AA, it is necessary to promote the process development (e.g., resetting of the process conditions and the like) so as to obtain Y as a result of the PAC verification until a sample is completed.

Specifically, demands of the development specification of the integration are incorporated with the PAC conditions of each module PAC. Referring to, for example, the "gate formation module (first module PAC)" shown in FIG. 4, sheet resistance, gate reliability and defect density are set as PAC items in the mark sheet for the first module PAC of the gate formation module shown in FIG. 5, and a rank and a standard are set for each PAC item. Herein, the standard means a numerical value that a value (a measured value) of its PAC item must met, and the standard of the sheet resistance R, for example, is $10\pm2\Omega/\square$. The rank indicates in which stage in the basic flow shown in FIG. 1, a value of the PAC item is required to meet its standard. For example, the sheet resistance is ranked as A, and this means that a value of the sheet resistance should meet its standard between the sample evaluation stage SP3 and the process condition establishment stage SP4.

The reason why the ranking is employed in the present embodiment is as follows: It is unnecessary for all the PAC items to meet their standards concurrently at a certain timing; and if a PAC item that must meet its standard in an earlier stage and a PAC item that may meet its standard in a later stage are differentiated, verification of the PAC item that must meet its standard in an early stage can be promoted with priority. For example, the PAC item of the gate reliability is ranked as B because PAC verification thereof may be preformed until the process development is completed.

In the mark sheet for the first module PAC of the gate formation module shown in FIG. 5, the rank and the standard are set for the PAC item of the defect density. Herein, the defect density has two types of standard. Namely, a standard (standard corresponding to rank A) to be met until the process condition establishment stage SP4 is 0.8 or less and a standard (standard corresponding to rank B) to be met until the process completion stage SP5 is 0.5 or less. This means that the yield may be increased gradually until the completion of the process development and it is unnecessary to decrease the defect density to 0.5 before the process condition establishment stage SP4. Further, as shown in FIG. 5, there is the column of judgment beside the column of standard in the mark sheet, and ◯ will be put into the column of judgment when a value of the PAC item meets its standard.

[Element PAC]

Subsequent to the setting of the PAC conditions of a module PAC, items (PAC items) to be verified through the PAC verification, timings (ranks) of performing the PAC verification and specific numerical values (standards) that their PAC items must meet are set in an element PAC in relation to the PAC conditions of the module PAC (specifically, the first module PAC of the gate formation module) in the PAC setting.

Referring to, for example, the gate formation module as shown in FIG. 5, the first module PAC of the gate formation module is linked with the first element PAC of the gate etching element and the second element PAC of the gate oxide film element.

Specifically, in the first element PAC of the gate etching element, etching rate uniformity, etching selectivity uniformity, etched shape uniformity and killer defect count are set as PAC items. For each PAC item, a rank and a standard are determined. For example, as shown in FIG. 5, the PAC item of the etching rate uniformity is ranked as A and its standard is set to ±10% or less. The PAC item of the etching selectivity uniformity is ranked as A and its standard is set to ±10% or less. The PAC item of the etched shape uniformity is ranked as A and its standard is set to ±8% or less. Also, the PAC item of the killer defect count is ranked as A and its standard is set to 20 or less. In short, etching conditions in the gate formation module are set so that values of PAC items meet their standards in the respective verifications (PAC verification) for the respective PAC items. Or, recipes for etching (a kind of gas to be used, a pressure, a flow rate and the like) are set so as to meet the PAC conditions of the first element PAC in the etching step, as shown in FIG. 3.

The most important features is that: the three items of the etching rate uniformity, the etching selectivity uniformity and the etched shape uniformity and their standard values are determined not independently but determined in association with the "sheet resistance" of the first module PAC of the gate formation module (the relationship among PACs is expressed by sorting the PAC items into (a) sheet resistance relation, (b) reliability relation and (c) defect density relation in FIG. 5.). In other words, the etching rate uniformity, as a PAC item of the element PAC, and its standard (±10% or less) are determined so as to meet the "standard", as a target value, of the "sheet resistance", which is a PAC item of the module PAC.

Similarly, the item and the standard value of the killer defect count in the first element PAC of the gate etching element are determined in relation to the defect density of the first module PAC of the gate formation module. Referring to, for example, the defect density in the first module PAC as shown in FIG. 5, in order to meet its standard, the killer defect count in the first element PAC of gate etching element must be reduced to 20 or less until the process condition establishment stage SP4 (rank A).

In the second element PAC of the gate oxide film element, growth rate uniformity of an oxide film, thickness uniformity of an oxide film, lifetime of an oxide film and killer defect count are set as the PAC items. For example, as shown in FIG. 5, the PAC item of the growth rate uniformity of an oxide film is ranked as A and its standard is ±10% or less, the PAC item of the thickness uniformity of an oxide film is ranked as A and its standard is ±10% or less, the PAC item of the lifetime of an oxide film (the lifetime of an oxide film that is formed on a substrate) is ranked as A and its standard is 1000μ seconds or more, and the PAC item of the killer defect count is ranked as A and its standard is 15 or less. In short, recipes for the gate oxide film formation must be determined, as shown in FIG. 3, so as to meet the PAC conditions of the second element of the gate oxide film formation technology.

In the second element PAC of the gate oxide film element, the PAC items such as the growth rate uniformity of an oxide film, the thickness uniformity of an oxide film and their standards are determined in relation to the "sheet resistance" of the first module PAC of the gate formation module, as shown in FIG. 5. Further, the PAC item of the lifetime of an oxide film and its standard are determined in relation to the "gate reliability" of the first module PAC of the gate formation module. Also, the PAC item of the killer defect count and its standard are determined in relation to the "defect density" of the first module PAC of the gate formation module. In short, the items and their standard values of each element PAC are determined so as to meet the respectively corresponding target values (standards) of the first module PAC of the PAC items of the gate formation module.

[Equipment PAC]

In the PAC setting, subsequent to setting of the PAC conditions of an element PAC, each of the PAC items, ranks and PAC standards is determined for an equipment PAC relating to the PAC conditions of the module PAC or the element PAC. Herein, a first equipment PAC of a gate etching equipment and a third equipment PAC of a gate oxide film forming equipment will be described as examples, with reference to FIG. 5.

As shown in FIG. 5, the first element PAC of the gate etching element and the first equipment PAC of the gate etching equipment are linked with each other and the second element PAC of the gate oxide film element and the third equipment PAC of the gate oxide film forming equipment are linked with each other.

Specifically, in the first equipment PAC of the gate etching equipment, gas flow rate precision, vacuum leakage rate stability (stability of the rate of a gas introduced into a vacuum chamber), metal contamination and particle count are set as the PAC items. Then, a rank and a standard are determined for each PAC item. For example, as shown in FIG. 5, the PAC item of the gas flow rate precision is ranked as AA and its standard is ±1% or less. This standard is determined according to the fact that the gas flow rate precision must be ±1% or less for meeting the standard (±10% or less) of the etching rate uniformity in the first element PAC of the gate etching element. In order to meet the standard (±1% or less) of a given gas flow rate, a mass flow meter with precision at such a percentage is necessary. Namely, the standard of the etching rate uniformity of the first element PAC of the gate etching element is ±10% or less, and accordingly, the gas flow rate precision of the mass flow meter being ±1% or less is established as an equipment specification. Also, as shown in FIG. 5, in the first equipment PAC of the gate etching equipment, the PAC item of the vacuum leakage rate stability is ranked as AA and its standard is ±1% or less, the PAC item of the metal contamination is ranked as AA and its standard is $10^{-8}$ or less, and the PAC item of the particle count is ranked as AA and its standard is 30 or less.

For the third equipment PAC of the gate oxide film forming equipment, gas flow rate precision, within wafer uniformity, metal contamination and particle count are set as the PAC items. Then, a rank and a standard are determined for each PAC item. As shown in FIG. 5, for example, the PAC item of the gas flow rate precision is ranked as AA and its standard is ±1% or less, the PAC item of the within wafer uniformity is ranked as AA and its standard is ±5% or less, the PAC item of the metal contamination is ranked as AA and its standard is $10^{-10}$ or less, and the PAC item of the particle count is ranked as A and its standard is 25 or less. Among these standards, the standard of the metal contamination is determined according to the fact that the metal contamination must be $10^{-10}$ or less for meeting the standard (1000μ seconds or more) of the lifetime of an oxide film in the second element PAC of the gate oxide film formation element. Further, in order to meet the standard ($10^{-10}$ or less) of the metal contamination, a specification of an equipment material which can realize the standard is necessary. Namely, the specification of the equipment material of an oxide film forming equipment is determined under the condition that the standard of the lifetime of an oxide film of the second element PAC of the gate oxide film element must be set to 1000μ seconds or more.

Figure 6:
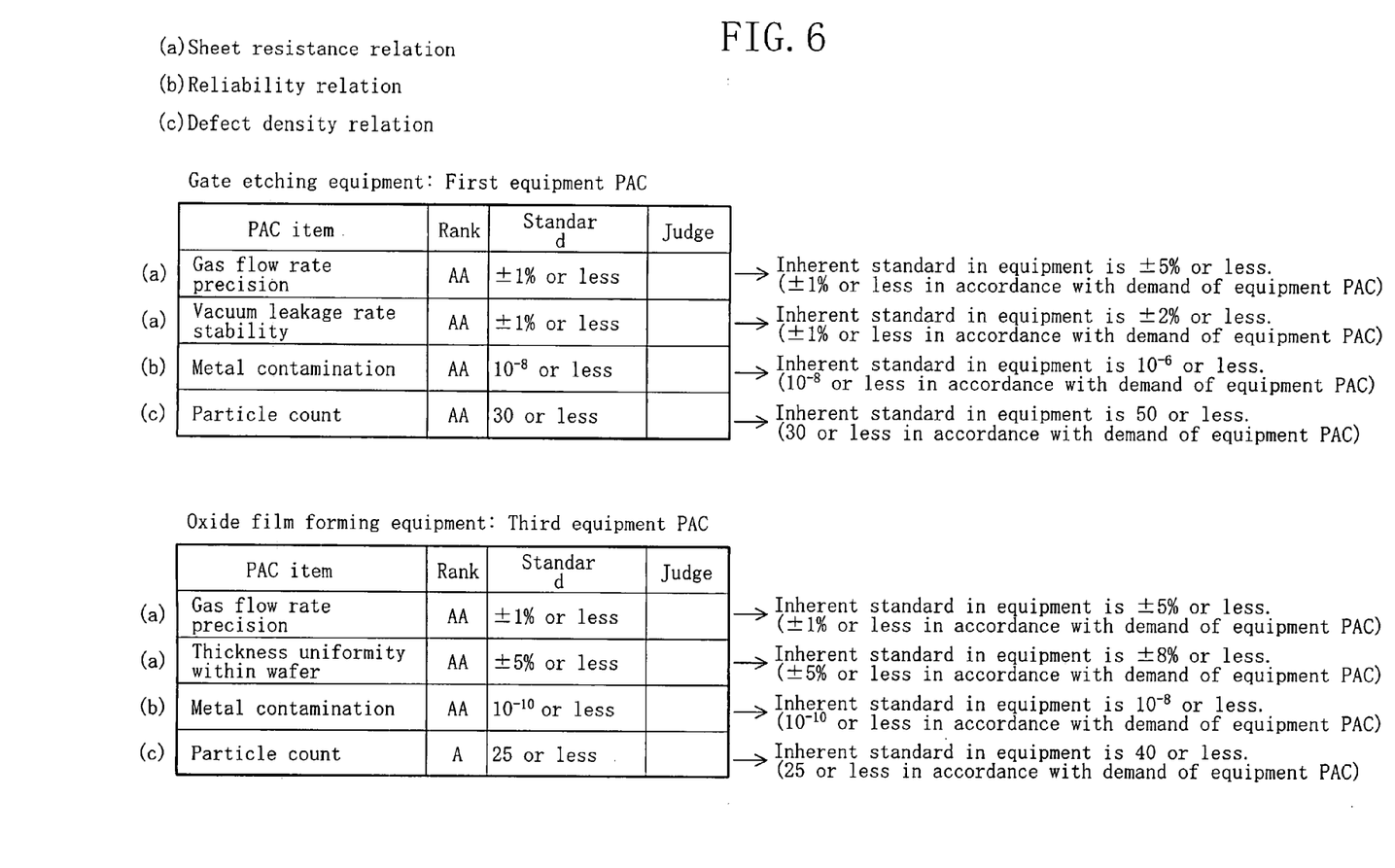
FIG. 6 is a view for explaining items and standard values of PACs which are put into a mark sheet for equipment PACs in the semiconductor manufacturing process developing method according to the embodiment of the present invention.

PAC items and their standard values to be put into the mark sheet for an equipment PAC will be described further in detail with reference to FIG. 6. The significant feature herein is that, as shown in FIG. 6, the PAC items and their standard values are determined not according to equipment's independent standards (inherent standards of the equipment). Equipments used in the process development have a close relationship with the element processes (element technologies). Therefore, the items and their standard values of an equipment PAC are determined not based on independent standards of a manufacturing equipment and the like but determined so as to meet the standard values of their items of the element PAC (or/and the standard values of their items of the module PAC). For example, as shown in FIG. 6, the gas flow rate precision and the vacuum leakage rate stability, which are the PAC items of the first equipment PAC of the gate etching equipment, have a relationship with the sheet resistance, which is the PAC item of the first module PAC of the gate formation module, as indicated by "(a)" (sheet resistance relation) in the drawing. Accordingly, the respective PAC standards of the gas flow rate precision and the vacuum leakage rate stability are determined taking account of the relationship with the first element PAC of the gate etching element. Specifically, the standard of the gas flow rate precision of the first equipment PAC is determined to ±1% or less in accordance with demand of the first element PAC though the usual standard of the gas flow rate precision is set to ±5% or less independently in the equipment. Similarly, the vacuum leakage rate stability of the first equipment PAC is determined to ±1% or less in accordance with the demand of the first element PAC though the unusual standard of thereof is set to ±2% or less independently in the etching equipment.

The PAC items and their standard values of each equipment PAC are determined in this way so as to meet the standard values of their items of the corresponding element PACs. By determining the PAC conditions (standard values and the like) of an equipment PAC in relation to a corresponding element PAC, the process of each module is optimized as a whole, instead of independent optimization for the equipments.

As described above, in the PAC setting in the present embodiment, an element PAC and a corresponding equipment PAC are linked with each other in the first module PAC of the gate formation module, and then, the standard values of the items to be met through the PAC verification in the element PAC and the corresponding equipment PAC are determined. Thereafter, the process recipes (pressure, time, gas and the like) in each step (the gate oxide film formation step, the lithography step, the etching step and the like of the gate formation module) are determined so that values of the PAC items meet their standards through the PAC verification accompanied by a sample experiment or the like, as shown in FIG. 3. Whereby, the process development in the gate formation module is completed.

[Process Development of Gate Formation Module]

The process development per module unit in the present embodiment will be described next by exemplifying the gate formation module, with reference to FIG. 1 and the like.

First of all, after determination that a manufacturing process is to be developed in the development planning stage SP1, a full process is divided into modules of the element isolation module, the gate formation module, the wiring module and the like, as shown in FIG. 2. Then, the PAC setting is performed for the gate formation module so that the judgment for the gate formation module in the process planning stage SP2 results in acceptance.

For the gate formation module, a mark sheet is made out in which the PAC items, ranks and standard values of the first module PAC of the gate formation module, the element PACs (the first element PAC of the gate etching element and the second equipment PAC of the gate oxide film formation element) and the equipment PACs (the first equipment PAC of the gate etching equipment and the third equipment PAC of the gate oxide film forming equipment) are clarified, as shown in FIG. 5.

In the PAC setting, the aforementioned thoroughgoing profound discussion is carried out until the judgment in the next process design stage SP2, namely, prior to the sample experiment so that every necessary PAC item is picked up and every standard value of every PAC item is set so as to be optimum for the whole process of the gate formation module. In so doing, items of the gate formation module which have been left vague in conventional process developments can be converted into explicit specs (standard values) in the PAC mark sheet. Then, in the process design stage SP2, the process recipes in each step of the gate formation module are determined so as to meet the standard values of their PAC items.

After the PAC setting of the gate formation module is completed as in FIG. 5, whether the process flow (including the recipes) of the gate formation module in FIG. 3 or the PAC setting in FIG. 5 involves any problems is judged in the process design stage SP2.

After the process design is completed in the process design stage SP2 as above, whether the process flow and the process conditions such as the process recipes involve any problems in manufacture on the sample lines is judged in the sample evaluation stage SP3. At this time, the PAC verification AA is performed as shown in FIG. 1 prior to the judgment in the sample evaluation stage SP3. In detail, in the gate formation module, the process conditions of the process flow for the gate formation module shown in FIG. 3 are determined so as to meet the standard value of each PAC item ranked as "AA" in the first module PAC, the first element PAC, the second element PAC, the first equipment PAC and the third equipment PAC, as shown in FIG. 5. Namely, in the PAC verification AA, only the items ranked as AA among the PAC items in the PAC mark sheet shown in FIG. 5 are focused and the process conditions are determined so that values of the focused items meet their standards.

Specifically, as shown in FIG. 5, as the PAC items to be verified through the PAC verification AA, there are gas flow rate precision, vacuum leakage rate stability, metal contamination and particle count in the first equipment PAC of the gate etching equipment. Similarly, gas flow rate precision, vacuum leakage rate stability and metal contamination in the third equipment PAC of the oxide film forming equipment are also the PAC items to be verified through the PAC verification AA. As described above, many PAC items are ranked as AA in each equipment PAC. Therefore, the PAC verification should be performed for each of these PAC items prior to the judgment in the sample evaluation stage SP3 and a judged result of "○" (○ means that the standard is met.) must be obtained in each of the PAC items. This means large dependency of the semiconductor manufacturing process on the manufacturing equipments. Therefore, in the process development, stabilization of the performance of the equipments by meeting the standard values of the PAC items of the equipment PACs is a key to enhancing the degree of perfection of the process of the module.

After it is confirmed that the judged result of every PAC item to be verified through the PAC verification AA is "○" in the sample evaluation stage SP3, the routine proceeds to the process condition establishment stage SP4 to perform the judgment as to whether the setting of the process conditions (conditions that has been qualified in the PAC verification AA) of the process flow and the process recipes involves any problems in manufacture in the factory lines. Then, the PAC verification A is performed as shown in FIG. 1 prior to the judgment in the process condition establishment stage SP4. In detail, the PAC verification for only the items ranked as A out of the PAC items in the PAC mark sheet shown in FIG. 5 is performed and the "process conditions" are established so as to obtain "○" in the judgment.

Specifically, as shown in FIG. 5, in the gate formation module, there are, as the PAC items to be verified through the PAC verification A, sheet resistance and defect density of the first module PAC of the gate formation module, etching rate uniformity and the like of the first element PAC of the gate etching element and growth rate uniformity of an oxide film and the like of the second element PAC of the gate oxide film element. For these PAC items ranked as A, the PAC verification for verifying the "process conditions" is performed prior to the judgment in the process condition establishment stage SP4 and the "process conditions" are established so as to obtain "○" in the judgment.

Herein, the PAC verification A will be described in detail by exemplifying defect density (DD) of the first module PAC of the gate formation module, with reference to the drawings.

Figure 7A:
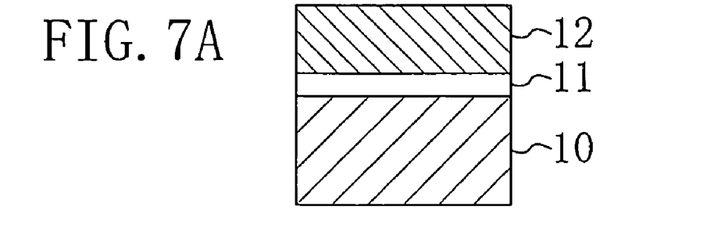
FIG. 7A to FIG. 7D are sections for explaining PAC verification in the semiconductor manufacturing process developing method according to the embodiment of the present invention and show respective steps for gate formation.
Figure 7B:
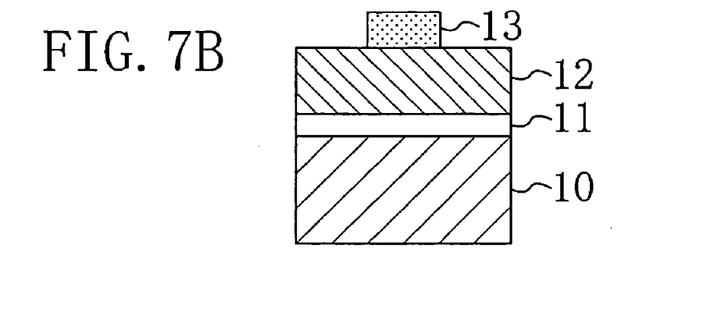
Figure 7C:
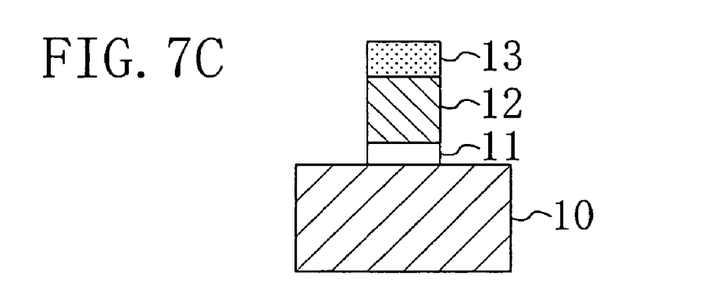
Figure 7D:
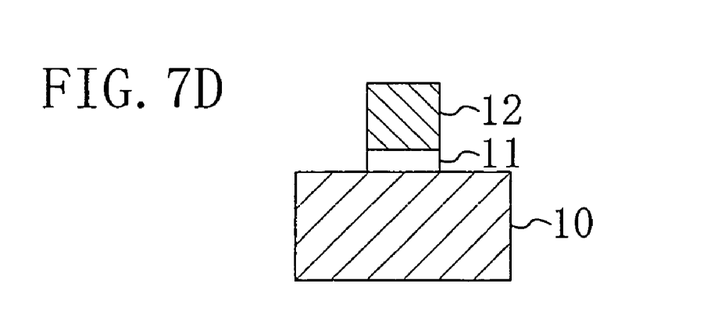

FIG. 7A to FIG. 7D are sections showing the respective steps for gate formation. After an oxide film 11 and a conducive film 12 are sequentially formed on a substrate 10 as shown in FIG. 7A, a resist pattern 13 for covering a gate formation region is formed on the conductive film 12 as shown in FIG. 7B. Next, as shown in FIG. 7C, the conductive film 12 and the oxide film 11 are sequentially etched using the resist pattern 13 as a mask to form a gate electrode made of the conductive film 12. Finally, as shown in FIG. 7D, the resist pattern 13 is removed and cleaning is performed.

Figure 8:
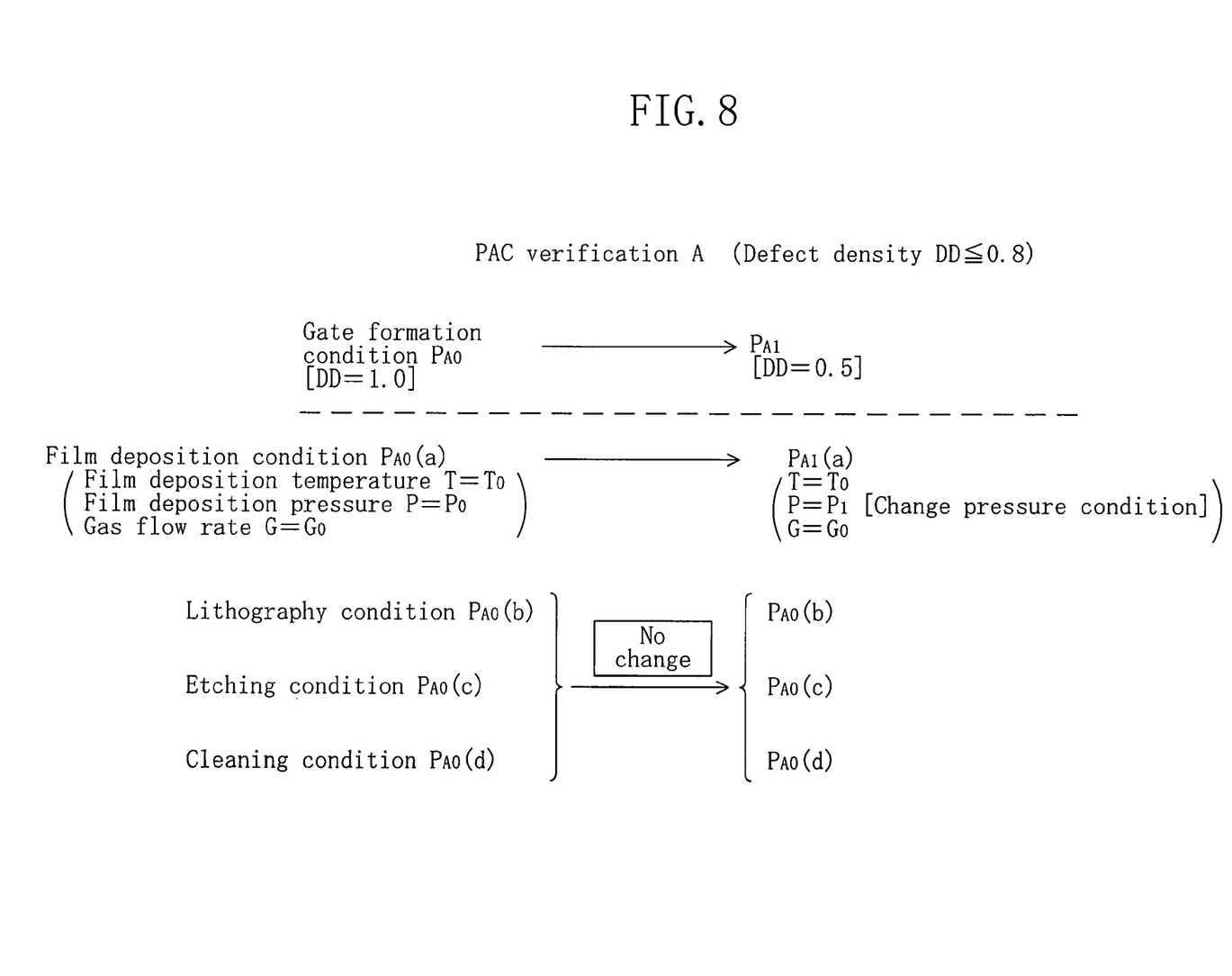
FIG. 8 is a view for explaining the PAC verification in the semiconductor manufacturing process developing method according to the embodiment of the present invention.

FIG. 8 shows the way to establish the process conditions in the gate formation module shown in FIG. 7A to FIG. 7D through the PAC verification A. In FIG. 8, a gate formation condition $P_{A0}$ is a set of conditions qualified in the PAC verification AA and includes a condition $P_{A0}(a)$ in the film deposition step shown in FIG. 7A, a condition $P_{A0}(b)$ in the lithography step shown in FIG. 7B, a condition $P_{A0}(C)$ in the etching step shown in FIG. 7C and a condition $P_{A0}(d)$ in the cleaning step shown in FIG. 7D. The film deposition condition $P_{A0}(a)$ includes conditions of film deposition temperature $T=T_0$, film deposition pressure $P=P_0$, gas flow rate $G=G_0$ and the like. When the module process was run through on the factory lines under the gate formation condition $P_{A0}$, a value of 1.0 was obtained as the defect density DD, which means that the standard of 0.8 or less was not met. Then, the PAC verification A was performed under a gate formation condition $P_{A1}$ in lieu of the gate formation condition $P_{A0}$. Herein, the gate formation condition $P_{A1}$ included a film deposition condition $P_{A1}(a)$, the lithography condition $P_{A0}(b)$, the etching condition $P_{A0}(C)$ and the cleaning condition $P_{A0}(d)$. The film deposition condition $P_{A1}(a)$ included conditions of the film deposition temperature $T=T_0$, film deposition pressure $P=P_1$, the gas flow rate $G=G_0$. Comparing the gate formation condition $P_{A0}$ with the gate formation condition $P_{A1}$, only the film deposition pressure P was changed in the film deposition condition $P_{A1}(a)$. Then, when the process of the module was run through on the factory lines under the gate formation condition $P_{A1}$, a value of 0.5 was obtained as the defect density DD, which means that the standard of 0.8 or less was met. Thus, it was confirmed that the judged result of the defect density DD as a PAC item was "○". Whereby, the PAC verification A for the defect density DD is completed.

Only after the PAC items to be verified through the PAC verification A meet their standard values and almost all the process conditions are established as above, the judgment is performed in the process condition establishment stage SP4 as to whether the thus established process conditions involve any problems in the factory lines. If the judgment result is "involving no problem", the judgment is performed in the process completion stage SP5 as to whether mass production can be performed on the factory lines under the process conditions (conditions qualified in the PAC verification A) when taking account of the yield and the reliability. Then, the PAC verification B is performed prior to the judgment in the process completion stage SP5, as shown in FIG. 1. Namely, the PAC verification only for the PAC items ranked as B in the PAC mark sheet shown in FIG. 5 is performed and the "process conditions" are established so as to obtain "○" in the judgment.

Specifically, as shown in FIG. 5, in the gate formation module, there are gate reliability and defect density of the first module PAC of the gate formation module as the PAC items to be verified through in the PAC verification B. In the PAC verification A prior to the process condition establishment stage SP4, the standards of the items ranked as A can be met only if the defect density is reduced to 0.8. However, if the defect density is above 0.5 in the PAC verification B prior to the process completion stage SP5, it is judged that mass production cannot be performed with the process. Therefore, the "process conditions" of the gate formation module are further restricted so that a value of the defect density, which is a PAC item of the first module PAC of the gate formation module, becomes 0.5 or less in the PAC verification B.

By the above described method, the process conditions that have been qualified in the judgment in the process completion stage SP5 are determined as process conditions that provide high yield and high quality in the gate formation module.

Similar to the case of the gate formation module, process conditions that provide high yield and high quality can be determined for the other modules such as the element isolation module, the wiring module by employing the manufacturing process development method in the present embodiment into which the PAC setting, the PAC verification and the basic flow until the process development completion shown in FIG. 1 are incorporated.

According to the present embodiment, in the process development in which a full process is divided into plural modules, the process conditions are determined so as to meet the PAC conditions strictly set in the PAC setting for each module in the respective judgment stages SP3 to SP5 performed after the process design stage SP2. Thus, the yields and the quality through the full process are enhanced naturally. Further, the process development can be promoted in the respective modules in parallel, instead of the conventional cases that the process conditions are determined through full process running. Hence, the time required for the process development can be shortened.

In the present embodiment, prior to the verification of a process flow by a sample experiment, each PAC item and each PAC standard are determined in the PAC setting, while linking the module PACs, the element PACs and the equipment PACs with one another. Hence, mismatching and the like among these technologies can be rectified prior to the verification of the process flow including recipes. As a result, speedy process development is realized by reducing retry or redesign of the process development, and the yield and quality of a product manufactured by the developed process are enhanced in an early stage.

In the present embodiment, the timing of the PAC verification is ranked for each PAC item in the PAC setting. Accordingly, a degree of urgency or importance can be set also in setting the PAC item. As a result, a PAC item with a high degree of urgency (i.e., a PAC item of which PAC standard must be met early) or with a high degree of importance can be recognized explicitly from the beginning (prior to the process design stage SP2). In addition, the process conditions can be determined in an early stage by paying attention to a PAC item with a high degree of urgency or importance.

It is noted that though the process of the gate module is mentioned as an example of the process development per module unit in the present embodiment, the same can be applied to other modules such as the wiring module, the element isolation module.

In the present embodiment, the PAC conditions of an element PAC are set based on the PAC condition setting of a corresponding module PAC, and the PAC conditions of an equipment PAC are set based on the PAC condition setting of a corresponding module PAC or a corresponding element PAC. However, it is possible to set the PAC condition of an element PAC or a module PAC based on the PAC condition setting of a corresponding equipment PAC or to set the PAC condition of a module PAC based on the PAC condition setting of a corresponding element PAC.

The present embodiment is premised that a full process is divided into a plurality of modules for process development per module unit. However, it is needless to say that a full process may be developed by employing the method shown in FIG. 1, without dividing into modules. If a process PAC (a PAC of a full process) instead of module PACs is defined and the element and equipment PACs are defined accordingly, the same method as in the present embodiment can be employed basically in development of the full process.

The development of a semiconductor manufacturing process is exemplified in the present embodiment, but the present invention is, of coerce, applicable to development of other manufacturing processes.

What is claimed is:

1. A manufacturing process designing method which is for dividing a full process necessary for designing a manufacturing process into a plurality of process modules and increasing a degree of perfection of the development in said process modules, comprising:
 a linking step of linking technical parameters of the process modules, the technical parameters of the process modules being composed of technical items and standards of the process modules with technical parameters of element technologies, the technical parameters of the element technologies being composed of technical items and standards of the element technologies used in said process modules;
 a setting step of carrying out the linking step and setting the technical items and standards included in the technical parameters of the process modules and the technical parameters of the element technologies;
 after the linking and setting steps, a design step of judging whether a process flow and process recipes are appropriate or not;
 a process condition establishment step of judging, after said design step, whether said process flow and process conditions including said process recipes involve any problems in factory lines; and
 a process completion step of judging, after said process condition establishment step, whether said process flow and said process conditions including said process recipes allow mass production in factory lines,
 wherein a verification step of verifying whether evaluation values of said technical items included in said technical parameters set in said setting step meet respectively said standards included in said technical parameters set in said setting step is performed in said process completion step,
 said setting step includes setting a defect density as one of said technical items included in said technical parameters and setting a standard of said defect density as one of said standards included in said technical parameters, and
 said verification step includes verifying whether a value of said defect density meets said standard.

2. The manufacturing process designing method of claim 1, wherein
 said linking step includes linking a technical parameter of equipment, the technical parameter of equipment being composed of technical items and standards of manufacturing equipments used in said process modules or said element technologies, with the technical parameters of the process modules or the technical parameters of the element technologies, and said setting step carries out said linking step and includes setting the technical items and standards included in the technical parameter of the equipment.

3. The manufacturing process designing method of claim 2, wherein
said setting step includes setting, as standards included in the technical parameter of the equipment, standard defined based on a relationship between said technical parameter of the equipment and said technical parameters of the process modules or said technical parameters of the element technologies, instead of independent standards of said manufacturing equipment.

4. The manufacturing process designing method of claim 1, wherein
a verification step of verifying whether evaluation values of said technical items included in said technical parameters set in said setting step meet respectively said standards included in said technical parameters set in said setting step is performed in said process condition establishment step.

5. The manufacturing process designing method of claim 1, further comprising:
a sample evaluation step of judging, between said design step and said process condition establishment step, whether said process flow and said process conditions including said process recipes involve any problems in sample lines.

6. The manufacturing process designing method of claim 5, wherein
a verification step of verifying whether evaluation values of said technical items included in said technical parameters set in said setting step meet respectively said standards included in said technical parameters set in said setting step is performed in said sample evaluation step.

7. A manufacturing process designing method which is for dividing a full process necessary for designing a manufacturing process into a plurality of process modules and increasing a degree of perfection of the development in said process modules, comprising:
a linking step of linking technical parameters of the process modules, the technical parameters of the process modules being composed of technical items and standards of the process modules with technical parameters of element technologies, the technical parameters of the element technologies being composed of technical items and standards of the element technologies used in said process modules;
a setting step of carrying out the linking step and setting the technical items and standards included in the technical parameters of the process modules and the technical parameters of the element technologies;
after the linking and setting steps, a design step of judging whether a process flow and process recipes are appropriate or not;
a process condition establishment step of judging, after said design step, whether said process flow and process conditions including said process recipes involve any problems in factory lines; and
a process completion step of judging, after said process condition establishment step, whether said process flow and said process conditions including said process recipes allow mass production in factory lines,
wherein a verification step of verifying whether evaluation values of said technical items included in said technical parameters set in said setting step meet respectively said standards included in said technical parameters set in said setting step is performed in said process completion step,
said setting step includes setting reliability as one of said technical items included in said technical parameters and setting a standard of said reliability as one of said standards included in said technical parameters, and
said verification step includes verifying whether a value of said reliability meets said standard.

8. The manufacturing process designing method of claim 7, wherein
said linking step includes linking a technical parameter of equipment, the technical parameter of equipment being composed of technical items and standards of manufacturing equipments used in said process modules or said element technologies, with the technical parameters of the process modules or the technical parameters of the element technologies, and
said setting step carries out said linking step and includes setting the technical items and standards included in the technical parameter of the equipment.

9. The manufacturing process designing method of claim 8, wherein
said setting step includes setting, as standards included in the technical parameter of the equipment, standard defined based on a relationship between said technical parameter of the equipment and said technical parameters of the process modules or said technical parameters of the element technologies, instead of independent standards of said manufacturing equipment.

10. The manufacturing process designing method of claim 7, wherein
a verification step of verifying whether evaluation values of said technical items included in said technical parameters set in said setting step meet respectively said standards included in said technical parameters set in said setting step is performed in said process condition establishment step.

11. The manufacturing process designing method of claim 7, further comprising:
a sample evaluation step of judging, between said design step and said process condition establishment step, whether said process flow and said process conditions including said process recipes involve any problems in sample lines.

12. The manufacturing process designing method of claim 11, wherein
a verification step of verifying whether evaluation values of said technical items included in said technical parameters set in said setting step meet respectively said standards included in said technical parameters set in said setting step is performed in said sample evaluation step.

13. A manufacturing process designing method which is for dividing a full process necessary for designing a manufacturing process into a plurality of process modules and increasing a degree of perfection of the development in said process modules, comprising:
a linking step of linking technical parameters of the process modules, the technical parameters of the process modules being composed of technical items and standards of the process modules with technical parameters of element technologies, the technical parameters of the element technologies being composed of technical items and standards of the element technologies used in said process modules;

a setting step of carrying out the linking step and setting the technical items and standards included in the technical parameters of the process modules and the technical parameters of the element technologies;

after the linking and setting steps, a design step of judging whether a process flow and process recipes are appropriate or not;

a verification step of verifying, after said design step, whether evaluation values of said technical items included in said technical parameters set in said setting step meet respectively said standards included in said technical parameters set in said setting step; and a process completion step of judging, after said design step, whether said process flow and process conditions included in said process recipes allow mass production in factory lines, wherein said verification step is performed plural times between said design step and said process completion step, said setting step includes setting a defect density as one of said technical items included in said technical parameters and setting a standard of said defect density as one of said standards included in said technical parameters, and at least one time of verification step that is performed plural times includes verifying whether an evaluation value of said defect density meets said standard.

14. The manufacturing process designing method of claim 13, wherein said setting step includes setting a timing of performing said verification step for each of said technical items of each of said technical parameters set in said setting step.

15. The manufacturing process designing method of claim 13, wherein said linking step includes linking a technical parameter of equipment, the technical parameter of equipment being composed of technical items and standards of manufacturing equipments used in said process modules or said element technologies, with the technical parameters of the process modules or the technical parameters of the element technologies, and said setting step carries out said linking step and includes setting the technical items and standards included in the technical parameter of the equipment.

16. The manufacturing process designing method of claim 15, wherein said setting step includes setting, as standards included in the technical parameter of the equipment, standard defined based on a relationship between said technical parameter of the equipment and said technical parameters of the process modules or said technical parameters of the element technologies, instead of independent standards of said manufacturing equipment.

17. A manufacturing process designing method which is for dividing a full process necessary for designing a manufacturing process into a plurality of process modules and increasing a degree of perfection of the development in said process modules, comprising:

a linking step of linking technical parameters of the process modules, the technical parameters of the process modules being composed of technical items and standards of the process modules with technical parameters of element technologies, the technical parameters of the element technologies being composed of technical items and standards of the element technologies used in said process modules;

a setting step of carrying out the linking step and setting the technical items and standards included in the technical parameters of the process modules and the technical parameters of the element technologies;

after the linking and setting steps, a design step of judging whether a process flow and process recipes are appropriate or not;

a verification step of verifying, after said design step, whether evaluation values of said technical items included in said technical parameters set in said setting step meet respectively said standards included in said technical parameters set in said setting step; and a process completion step of judging, after said design step, whether said process flow and process conditions included in said process recipes allow mass production in factory lines, wherein said verification step is performed plural times between said design step and said process completion step, said setting step includes setting reliability as one of said technical items included in said technical parameters and setting a standard of said reliability as one of said standards included in said technical parameters, and at least one time of verification step that is performed plural times includes verifying whether an evaluation value of said reliability meets said standard.

18. The manufacturing process designing method of claim 17, wherein said linking step includes linking a technical parameter of equipment, the technical parameter of equipment being composed of technical items and standards of manufacturing equipments used in said process modules or said element technologies, with the technical parameters of the process modules or the technical parameters of the element technologies, and said setting step carries out said linking step and includes setting the technical items and standards included in the technical parameter of the equipment.

19. The manufacturing process designing method of claim 18, wherein said setting step includes setting, as standards included in the technical parameter of the equipment, standard defined based on a relationship between said technical parameter of the equipment and said technical parameters of the process modules or said technical parameters of the element technologies, instead of independent standards of said manufacturing equipment.

20. The manufacturing process designing method of claim 17, wherein said setting step includes setting a timing of performing said verification step for each of said technical items of each of said technical parameters set in said setting step.

* * * * *